Feb. 16, 1960 S. MATLACHOWSKY 2,924,944
HYDRAULIC CONTROL SYSTEM FOR THE TOOLS OR OTHER
MOVABLE MEMBERS OF AN AUTOMATIC LATHE
Filed Dec. 18, 1957 2 Sheets-Sheet 2
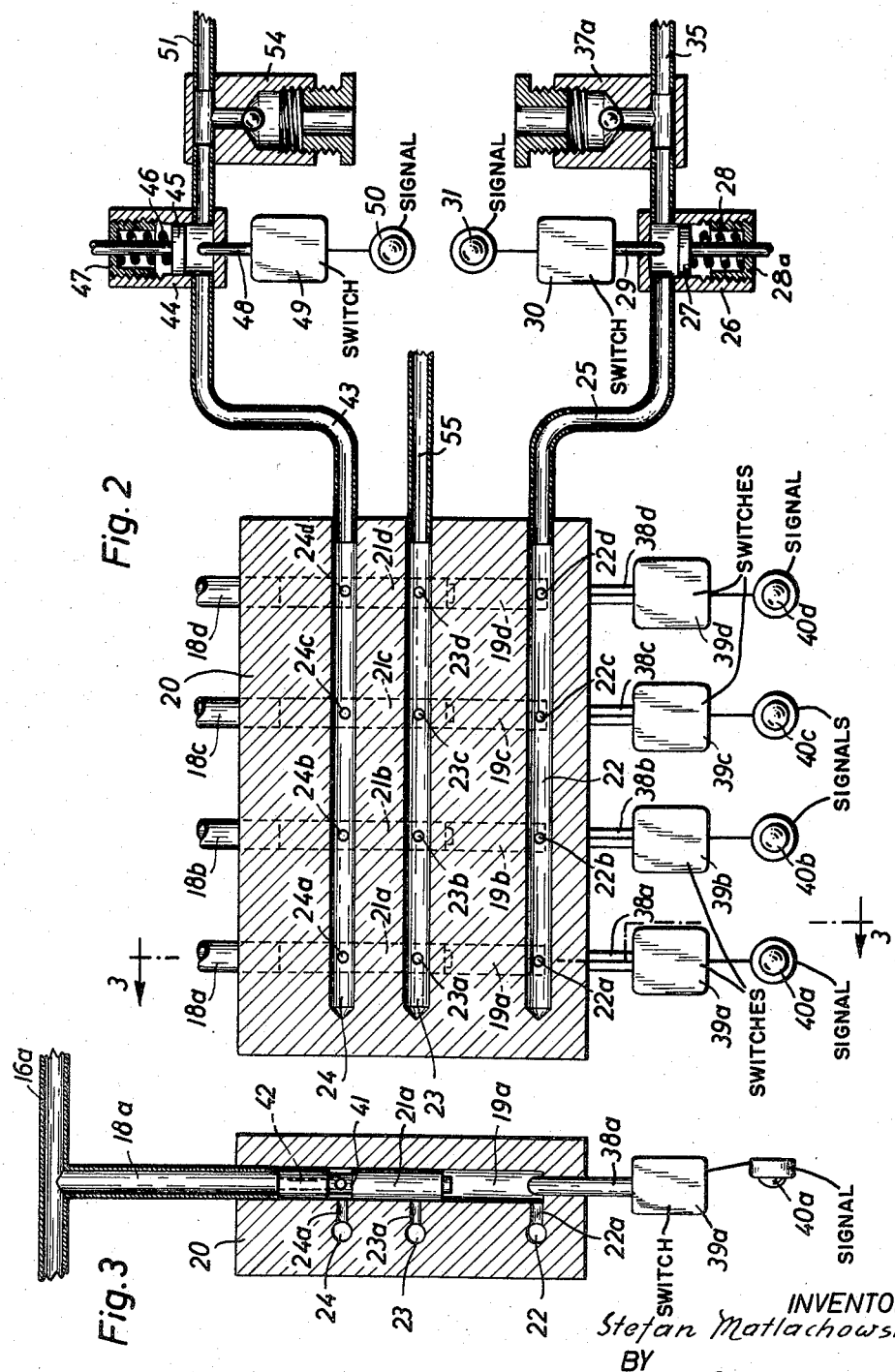
INVENTOR
Stefan Matlachowsky
BY

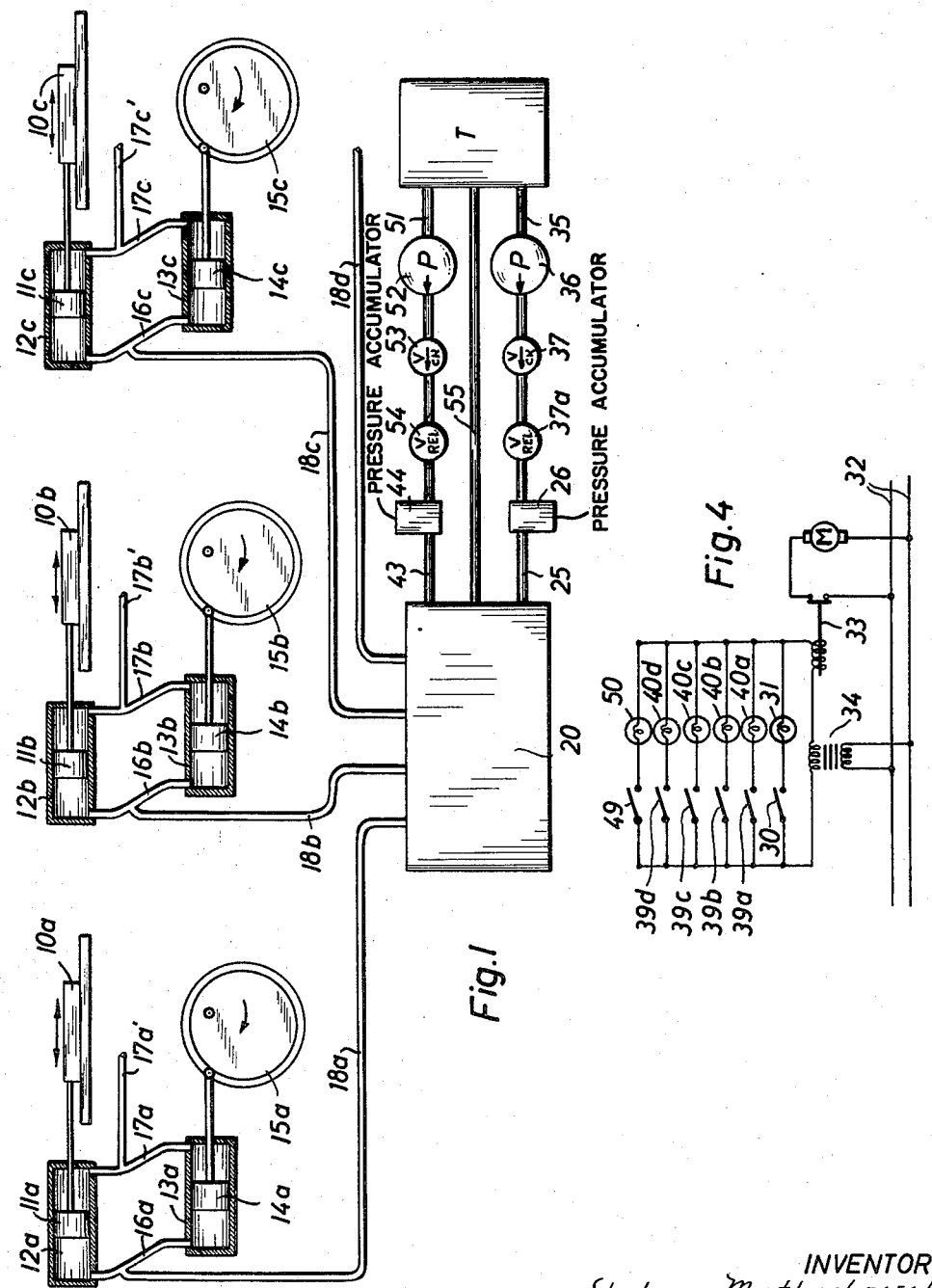

United States Patent Office 2,924,944
Patented Feb. 16, 1960

2,924,944

HYDRAULIC CONTROL SYSTEM FOR THE TOOLS OR OTHER MOVABLE MEMBERS OF AN AUTOMATIC LATHE

Stefan Matlachowsky, Westphalia, Germany, assignor to Alfred H. Schütte, Koln-Deutz, Germany, a German company Application December 18, 1957, Serial No. 703,640

Claims priority, application Germany December 21, 1956

11 Claims. (Cl. 60—54.5)

This invention relates generally to the control systems for the tools or other movable members of an automatic lathe, and more particularly is directed to control systems of the kind wherein a mechanically actuated control piston is reciprocable in a control cylinder and effects corresponding reciprocal movement of a working piston slidable within a working cylinder and suitably connected to a tool slide or other movable member of the automatic lathe, with the transmission of movement from the control piston to the working piston being effected by means of columns of hydraulic fluid contained in pipes or conduits opening into the control and working cylinders at the opposite sides of the related pistons.

In the existing control systems of the described character, each column of hydraulic fluid is acted upon by a spring urged compensating piston movable within a cylindrical housing, which may be an end portion of the related working cylinder, and which communicates with the related pipe or conduit so that, in the event of a deficiency in the amount of hydraulic fluid in the related pipe or conduit producing a relatively low pressure opposing the spring urged movement of the compensating piston, the latter is displaced in the direction of its spring urged movement to maintain an adequate supply of hydraulic fluid in the related pipe or conduit, whereas, in the event of the occurrence of an excessive pressure in the pipe or conduit, for example, as a result of excessive resistance to movement of the working piston or of an excess supply of hydraulic fluid in the pipe or conduit, the compensating piston moves in opposition to the spring acting thereon in order to automatically release such excessive supply of hydraulic fluid or the excessive pressure. Further, in the existing control systems, automatic switch means are associated with each compensating piston to be actuated by the latter in response to such movement of the compensating piston as is caused by a pressure in the related pipe or conduit that exceeds a predetermined pressure in order to interrupt the operation of the associated lathe and to energize a signal or indicator.

In the existing control systems of the described character, the pipes or conduits connecting each pair of working and control cylinders are not only provided with individual compensating pistons, but the springs acting upon such individual compensating pistons are also individually and independently adjustable in order to determine individual pressures at which operation of the lathe will be interrupted.

However, it has now been found that, in many cases, it is suitable to employ the same pressure in the columns of hydraulic fluid serving to transmit the movement of two or more control pistons to the related working pistons.

Accordingly, it is an object of the present invention to provide a hydraulic control system for the tools or other movable members of an automatic lathe of the kind employing columns of hydraulic fluid for transmitting the movement of control pistons to related working pistons with a compensating piston acting upon the hydraulic fluid in at least each column which is under a relatively increased pressure during the working stroke of the related working piston, and wherein all of the compensating pistons are urged in the direction for maintaining pressure within the related columns of hydraulic fluid by means of a common column of hydraulic fluid which is acted upon by an adjustably spring urged pressure determining piston having switch means associated therewith to interrupt operation of the lathe and to energize a signal or indicator in the event of a deficiency of fluid in the common column of hydraulic fluid.

Further, in accordance with an aspect of this invention, switch means is associated with each of the compensating pistons for actuation by the latter in response to the occurrence of an excessive pressure in the related column of hydraulic fluid, for example, when some obstacle prevents completion of the working stroke of the related tool slide or other movable member of the lathe, in order to interrupt operation of the lathe and to energize a related signal or indicator.

In accordance with another feature of the invention, a common feed line is provided for automatically replenishing the supply of hydraulic fluid in the columns of hydraulic fluid associated with the several compensating pistons in response to the movement of the latter in the direction caused by the pressure in the common column of hydraulic fluid. Preferably, the common feed line opens into a feed cylinder containing a feed piston which is displaced by a spring in order to ensure the automatic flow of hydraulic fluid through the common feed line into any column of hydraulic fluid associated with a compensating piston which has moved to a fluid-replenishing position. Preferably, the feed piston has switch means associated therewith for actuation by the feed piston when the supply of hydraulic fluid in the feed cylinder and the feed line becomes deficient in order to interrupt the operation of the lathe and to energize a signal or indicator until the emergency supply of hydraulic fluid in the common feed line and the feed cylinder is replaced.

The above, and other objects, features and advantages of the invention, will be apparent in the following detailed description of an illustrative embodiment thereof which is to be read in connection with the accompanying drawings forming a part hereof, and wherein:

Fig. 1 is a schematic view of a hydraulic control system for the tools or other movable members of an automatic lathe, and embodying the present invention;

Fig. 2 is a detail schematic view of a portion of the system of Fig. 1, and which is shown partly broken away and in section;

Fig. 3 is a sectional view taken along the line 3—3 of Fig. 2; and

Fig. 4 is a wiring diagram of an electrical system included in the control system of Fig. 1.

Referring to the drawings in detail, and initially to Fig. 1 thereof, it will be seen that, in a hydraulic control system embodying this invention, two or more tool slides, or other movable members of the associated automatic lathe, for example, the tool slides 10a, 10b and 10c are actuated by related working pistons 11a, 11b and 11c, respectively, to which they are suitably connected, with the working pistons being slidable within working cylinders 12a, 12b and 12c. Control cylinders 13a, 13b and 13c are associated with the working cylinders 12a, 12b and 12c, respectively, and contain slidable control pistons 14a, 14b and 14c, respectively, which are mechanically reciprocated, for example, by the illustrated control cams 15a, 15b and 15c. Pipes 16a and 17a connect the working cylinder 12a with the related control cylinder 13a at the opposite sides of the related pistons so that, when the interior spaces of the cylinders 12a and 13a and the pipes 16a and 17a are filled with hydraulic fluid, oppositely acting columns of hydraulic fluid will be provided between the pistons 11a and 14a in order to effect displacement of the working piston 11a in response to the mechanically actuated movement of the related control piston 14a. Similarly, the cylinders 12b and 13b are connected by pipes 16b and 17b, and the cylinders 12c and 13c are connected by pipes 16c and 17c.

In order to ensure that the movement of each working piston will correspond to the movement of the related control piston, particularly in the direction of the working stroke of the working piston, for example, in the direction toward the right, as viewed in Fig. 1, it is essential that the column of hydraulic fluid transmitting the movement of the control piston for effecting the working stroke of the working piston should contain a quantity of hydraulic fluid within certain predetermined limits and under a predetermined pressure.

In order to control the quantity and pressure of the fluid in the column of hydraulic fluid for effecting the working stroke of each of the working pistons 11a, 11b and 11c, pipes or conduits 18a, 18b and 18c branch off from the pipes 16a, 16b and 16c and connect to parallel bores 19a, 19b and 19c, respectively (Fig. 2) opening at one side of a compensating piston housing 20. It will be seen that Figs. 1 and 2 of the drawings additionally illustrate a pipe or conduit 18d opening into a bore 19d of the housing 20, and it is to be understood that the pipe 18d is also to be connected to a pipe extending between a working cylinder and a control cylinder (not shown in Fig. 1) in the same manner as the pipes or conduits 18a, 18b and 18c. In order to ensure a predetermined pressure and a certain quantity of hydraulic fluid with regard to the return stroke there are conduits 17a', 17b' and 17c' branching off from the pipes 17a, 17b and 17c and connecting to the same compensating piston housing 20 or to similar means (not shown).

Referring to Figs. 2 and 3, it will be seen that the bores 19a, 19b, 19c and 19d contain axially slidable compensating pistons 21a, 21b, 21c and 21d, respectively, and that the housing 20 is further provided with three parallel, spaced apart bores 22, 23 and 24 extending at right angles to the bores 19a–19d. The bore 22 communicates with the ends of the bores 19a–19d remote from the pipes 18a–18d, respectively, by way of passages 22a–22d, respectively. The bore 23 communicates with the bores 19a–19d by way of passages 23a–23d which open into the bores 19a–19d at locations spaced forwardly from the locations of the passages 22a–22d, respectively. Further, the bore 24 communicates with the bores 19a–19d by way of passages 24a–24d, respectively, which open into the related compensating piston containing bores at locations spaced forwardly from the locations of the related passages 23a–23d.

It will be apparent that hydraulic fluid in the bore 22 will form a common column of hydraulic fluid acting with equal pressure on all of the compensating pistons 21a–21d to urge the latter forwardly, that is, in the direction toward the related pipes 18a–18d, respectively, thereby to tend to maintain a generally constant pressure within the associated column of hydraulic fluid connecting a control cylinder with a working cylinder, for example, in the pipe 16a connecting the control cylinder 13a with the working cylinder 12a. In order to determine the pressure of the hydraulic fluid thus acting on the compensating pistons 21a–21d, the bore 22 is connected to a pipe 25 which extends to a cylinder 26 containing a pressure-determining piston 27 acted upon by a spring 28. In order to permit adjustment of the pressure of the hydraulic fluid within cylinder 26, pipe 25 and bore 22, the spring 28 which acts on piston 27 is engaged by an abutment 28a screwed into the cylinder 26 so that, by turning the abutment 28a, the force applied by the spring 28 to the piston 27, and thus the pressure of the hydraulic fluid in bore 22, can be varied.

In the event of a deficiency in the quantity of hydraulic fluid in bore 22 and pipe 25, for example, as a result of a leak in the pipe 25 or in its connections to the housing 20 and the cylinder 26, spring 28 will move piston 27 toward an end wall of cylinder 26 to engage a switch-actuating member 29 for closing a normally open switch 30. Closing of switch 30 is intended to energize a related indicator or signal 31 and to interrupt the drive or operation of the associated lathe. Thus, as shown in Fig. 4, the motor M of the associated lathe may be connected to power feed lines 32 by way of an energizing circuit that includes a normally closed relay 33. The coil of the relay 33 is connected in series with the secondary winding of a transformer 34, having its primary winding connected to the supply lines 32, and also in series with the normally open switch 30 and the signal or indicator 31, shown as a lamp, so that, when the switch 30 is closed, as described above, the coil of relay 33 is energized to open the relay, and thereby interrupt the energizing circuit of the motor M, and, simultaneously, the lamp 31 is illuminated to indicate the cause of the cessation of operation.

In order to permit the supply of hydraulic fluid in bore 22, pipe 25 and cylinder 26 to be replenished following the interruption of operation of the lathe in the manner described above, a pipe or line 35 extends from a tank T containing a supply of hydraulic fluid and connects to the pipe 25. The pipe 35 contains a pump 36, which may be hand operated, and a check-valve 37 to prevent the back flow of hydraulic fluid from pipe 25, through pipe 35 to tank T during normal operation. The pipe 35 also contains a pressure relief-valve 37a, which prevents the development of an excess pressure within the common feed system during the operation of the pump 36.

In order to detect the occurrence of an excessive pressure in any one of the pipes 16a, 16b, 16c, etc., as might occur when an obstruction, for example, a broken tool, prevents the completion of the working stroke of the working piston 11a, 11b or 11c, while the control piston is mechanically actuated through its complete stroke, switch-actuating fingers 38a, 38b, 38c and 38d project axially into the bores 19a–19d, respectively, through the ends of the latter remote from the pipes 18a–18d, respectively, and are connected to normally open switches 39a, 39b, 29c and 39d, respectively. When an excessive pressure occurs, for example, in the pipe 16a, and is transmitted through the related pipe 18a to act upon the compensating piston 21a in the bore 19a, the compensating piston is moved rearwardly and pushes the related switch-actuating finger 38a to close the switch 39a. As seen in Fig. 4, the normally open switches 39a, 39b, 39c and 39d are connected in series with indicators or signals 40a, 40b, 40c and 40d, respectively, shown in the form of lamps, and such series connected normally open switches and lamps are all connected in parallel with the previously mentioned series connected switch 30 and lamp 31. Thus, when any one of the switches 39a–39d is closed in response to the occurrence of an excess pressure in the related pipe connecting the associated working and control cylinders, closing of the switch serves to illuminate the related signal lamp 40a, 40b, 40c or 40d and to complete the circuit for energizing the relay 33 so that the motor M is rendered inoperative, thereby to halt the drive of the automatic lathe.

It is to be understood that the bores 23 and 24 in the housing 20 are located so that the passages 23a–23d and 24a–24d extending from the bores 23 and 24 into the bores 19a–19d are normally closed by the related compensating pistons 21a–21d, respectively. However, as shown in Fig. 3, each of the compensating pistons 21a–21d is formed with an annular groove 41 spaced from the forward end of the compensating piston and communicating with an axial bore 42 which opens at the forward end of the compensating piston. The annular groove 41 is located to register with the related passage 24a, 24b, 24c or 24d when the pressure acting against the forward end of the compensating piston undergoes an abnormal reduction, for example, by reason of a deficiency of hydraulic fluid in the associated pipes 16a and 18a–16d and 18d, as a result of leakage from such pipes. A common feed line 43 is connected to the bore 24 and extends from a feed cylinder 44 having a feed piston 45 movable therein and acted upon by a spring 46 which engages an adjustable abutment 47 screwed into the cylinder 44. Cylinder 44, pipe 43 and bore 24 contain a supply of hydraulic fluid under a pressure determined by the adjustable force exerted on piston 45 by spring 46 so that, when the annular groove 41 of any one of the compensating pistons registers with the related passage 24a–24d, hydraulic fluid is forced from the feed bore 24 into that one of the pipes 18a–18d communicating with the hydraulic system having a deficiency of hydraulic fluid.

Since the emergency supply of hydraulic fluid contained in cylinder 44, pipe 43 and feed bore 24 is depleted by repeated automatic filling of the hydraulic systems communicating with the pipes 18a–18d, a switch-actuating finger 48 extends into cylinder 44 for engagement by piston 45 to close a normally open switch 49 upon the reduction of the quantity of fluid in cylinder 44 below a predetermined level. As shown in Fig. 4, the normally open switch 49 is connected in series with a signal or indicator 50, shown in the form of a lamp, and the series connected switch 49 and lamp 50 are connected in parallel with the previously mentioned switch 30 and lamp 31 so that, when switch 49 is closed, in the manner indicated above, lamp 50 is illuminated to indicate the deficiency in the supply of fluid in the common fluid feed system made up of the cylinder 44, pipe 43 and bore 24, and simultaneously, to energize the relay 33 for halting operation of motor M, thereby to halt the associated automatic lathe.

In order to replenish the emergency supply of hydraulic fluid in the above described automatically operating common feed system, a pipe 51 extends from the supply tank T to the cylinder 44 and is provided with a pump 52, a check-valve 53, and a pressure-relief valve 54 disposed in the order named in the direction of flow of hydraulic fluid through the pipe 51. The check-valve 53 serves to prevent the back-flow of hydraulic fluid through pipe 51 from cylinder 44 to tank T, while the pressure-relief valve 54 prevents the development of an excess pressure within the common feed system during the operation of the pump 52. It would also be possible to replace pumps 36 and 52 by a single pump (not shown) which would serve both pipes 25 and 43.

The passages 23a–23d opening from the bore 23 into the bores 19a–19d, respectively, are located along the latter so that, when the quantity of hydraulic fluid in any one of the hydraulic systems communicating with the pipes 18a–18d, respectively, reaches an excessive amount, the related compensating piston 21a–21d is pushed back in its bore 19a–19d to a position where the annular groove 41 of the compensating piston registers with the related passage 23a–23d thereby to permit the exhaust of the excess of hydraulic fluid through the bore 42 of the compensating piston, the passage 23a–23d, the bore 23, and a pipe 55 which extends from bore 23 and may return to the tank T, as shown in Fig. 1.

Although only the pipes 16a, 16b, 16c etc., extending between the related working and control cylinders have compensating pistons associated therewith in the above described embodiment of the invention, it will be apparent that the number of compensating pistons in housing 20 may be suitably increased to provide a compensating piston associated with each of the pipes 16a and 17a, 16b and 17b, 16c and 17c, etc., thereby to provide desired compensation and control during both the working stroke and the return stroke of each of the tool slides or other movable members of the automatic lathe.

It will be apparent that, in the above described hydraulic control system embodying the present invention, the quantity and pressure of the hydraulic fluid contained in two or more hydraulic motion-transmitting systems, for example, in the pipes 16a, 16b and 16c, are maintained within predetermined limits under the influence of a common control, and that excessive variations beyond such limits serve to actuate suitable signals or indicators and to halt operation of the associated lathe. Further, a common automatic means is provided for replenishing the supplies of hydraulic fluid in the motion-transmitting systems when such quantities are gradually reduced by slight leaks, whereas serious leaks indicative of a malfunctioning of the lathe quickly drain the emergency supply of hydraulic fluid in cylinder 44 and result in operation of the signal 50 and simultaneous cessation of the operation of the lathe. Thus, where two or more hydraulic motion-transmitting systems may be operated under the same hydraulic pressure, the described hydraulic control system provides a substantially simplified arrangement for simultaneously controlling the pressures and quantities of hydraulic fluid in such motion-transmitting systems.

Although an illustrative embodiment of the invention has been described in detail herein, with reference to the accompanying drawings, it is to be understood that the invention is not limited to that precise embodiment, and that various modifications may be effected therein without departing from the scope or spirit of the invention, except as defined in the appended claims.

What is claimed is:

1. In a hydraulic servo-system having at least two mechanically actuated control pistons movable in control cylinders and related working pistons movable in working cylinders, with hydraulic fluid containing pipes connecting the control cylinders to the related working cylinders to effect movement of each working piston in response to movement of the related control piston; the combination of a compensating piston acting at one side on the hydraulic fluid in at least one of said pipes extending between each control cylinder and the related working cylinder, means defining a common column of hydraulic fluid acting simultaneously on all compensating pistons, at the other sides of the latter, to insure that the movements of the working pistons will correspond to the movements of the related control pistons independent of the quantity of hydraulic fluid in said pipes, means exerting an adjustable pressure on said common column of hydraulic fluid so that the position of each compensating piston is determined by the quantity of hydraulic fluid in the pipe against which it acts and by the relative pressures of the hydraulic fluid at the opposite sides of the compensating piston, and means automatically operative in response to the movement of any of said compensating pistons corresponding to a deficiency of hydraulic fluid in the related one of said pipes to replenish the amount of hydraulic fluid in said related one of the pipes, the last mentioned means including a common feed line, means for communicating said common feed line with said pipes by way of the related compensating pistons when the latter have undergone said movement corresponding to a deficiency of hydraulic fluid in said related pipes, a cylinder connected to said common feed line and, with the latter, containing an emergency supply of hydraulic fluid, and a spring urged piston in said cylinder acting on said emergency supply of hydraulic fluid to maintain a pressure of the latter adequate to cause a flow thereof into any one of said pipes having a deficient amount of hydraulic fluid therein.

2. In a hydraulic servo-system; the combination as in claim 1, further comprising indicating means operated by said spring urged piston to indicate depletion of said emergency supply of hydraulic fluid.

3. In a hydraulic servo-system; the combination as in claim 2, further comprising a source of hydraulic fluid, conduit means connecting said source to said cylinder, pump means in said conduit means for supplying hydraulic fluid from said source to said cylinder when said emergency supply of hydraulic fluid is depleted, and pressure relief means in said conduit means between said pump means and said cylinder to prevent the development of excess pressure in said emergency supply of hydraulic fluid during operation of said pump means.

4. In an automatic lathe having a drive motor and movable members; the combination of at least two working pistons connected to related movable members and reciprocable in related working cylinders for actuating said related movable members, a control cylinder for each working cylinder containing a mechanically actuated control piston, a pair of pipes connecting each control cylinder to the related working cylinder at the opposite sides of the pistons therein and containing hydraulic fluid so that the movement of each control piston is hydraulically transmitted to the related working piston, an individual compensating piston for at least one of each pair of pipes, a common housing for all compensating pistons having parallel bores slidably receiving the latter, means communicating each bore with the related pipe so that the hydraulic fluid in the latter is acted upon by one end of the related compensating piston, a transverse bore extending at right angles to said parallel bores in said housing and passages opening from said transverse bore into said bores receiving the compensating pistons to define a common column of hydraulic fluid opening into each bore to simultaneously act against the other end of each compensating piston, and yieldable means applying an adjustable pressure to said common column of hydraulic fluid so that said compensating pistons move in the related bores to compensate for variations in the amounts of hydraulic fluid contained in the related pipes, thereby to ensure that the movement of each working piston corresponds to the mechanically actuated movement of the related control piston independent of the quantities of hydraulic fluid in said pipes.

5. In an automatic lathe having a drive motor and movable members; the combination as in claim 4, wherein said yieldable means applying an adjustable pressure to said common column of hydraulic fluid includes a cylinder having a pressure applying piston therein, pipe means communicating said transverse bore with said cylinder, a spring acting, at one end, against said pressure applying piston, and an adjustable abutment engaging the other end of said spring to vary the force of said spring against said pressure applying piston, and further comprising an electric circuit for energizing said motor and having a switch interposed therein, an actuating member for said switch engageable by said pressure applying piston upon movement of the latter corresponding to a predetermined deficiency of fluid in said common column of hydraulic fluid to halt the operation of said motor.

6. In an automatic lathe having a drive motor and movable members; the combination of at least two working pistons connected to related movable members and reciprocable in related working cylinders for actuating said related movable members, a control cylinder for each working cylinder containing a mechanically actuated control piston, a pair of pipes connecting each control cylinder to the related working cylinder at the opposite sides of the pistons therein and containing hydraulic fluid so that the movement of each control piston is hydraulically transmitted to the related working piston, an individual compensating piston for at least one of each pair of pipes, a common housing for all compensating pistons having parallel bores slidably receiving the compensating pistons, means communicating each of said parallel bores with the related pipe so that the hydraulic fluid in the latter is acted upon by one end of the related compensating piston, said common housing further having a transverse bore extending at right angles to said parallel bores in said housing and passages opening from said transverse bore into said bores receiving the compensating pistons to define a common column of hydraulic fluid opening into each of said parallel bores and simultaneously acting against the other end of each compensating piston, yieldable means applying an adjustable pressure to said common column of hydraulic fluid so that said compensating pistons move in the related parallel bores to compensate for variations in the amounts of hydraulic fluid contained in the related pipes, thereby to ensure that the movement of each working piston corresponds to the mechanically actuated movement of the related control piston independent of the quantities of hydraulic fluid in said pipes, said common housing further having a second transverse bore parallel to said first transverse bore and passages opening from said second transverse bore into said bores receiving the compensating piston, each compensating piston normally closing the related passage from said second transverse bore, each compensating piston further having fluid conducting means opening radially, at a location intermediate the ends of the compensating piston, and at said one end of the latter, so that, when a compensating piston moves in the direction of said one end in response to a predetermined deficiency in the amount of fluid in the related pipe, said fluid conducting means of the compensating piston registers with the related passage from said second transverse bore to establish communication between the latter and said related pipe, an emergency supply of hydraulic fluid under pressure, and means connecting said emergency supply with said second transverse bore so that a deficiency of hydraulic fluid in any of said pipes associated with a compensating piston is automatically replenished from said emergency supply by way of said second transverse bore and said fluid conducting means of the related compensating piston.

7. In an automatic lathe having a drive motor and movable members; the combination as in claim 6, further comprising a cylinder containing said emergency supply of hydraulic fluid, a spring urged piston in said cylinder acting on said emergency supply to pressurize the latter, switch means actuable by said spring urged piston upon the depletion of said emergency supply of hydraulic fluid, and signal means operated in response to actuation of said switch means.

8. In an automatic lathe having a drive motor and movable members; the combination as in claim 7, further comprising an electric circuit for operating said motor and having said switch means interposed therein to halt the operation of the motor upon the actuation of said switch means.

9. In an automatic lathe having a drive motor and movable members; the combination as in claim 7, further comprising a source of hydraulic fluid, and pump means for transferring hydraulic fluid from said source to said cylinder to replenish said emergency supply following the depletion thereof.

10. In an automatic lathe having a drive motor and movable members; the combination as in claim 6, wherein said common housing has a third transverse bore and passages opening from the latter into said bores receiving the compensating pistons at locations intermediate the passages from said first and second transverse bores so that said passages from the third transverse bore are normally closed by said compensating pistons and, when a compensating piston is displaced in the direction toward said other end thereof by an oversupply of hydraulic fluid in the related pipe, said fluid conducting means of the displaced compensating piston registers with the related passage from the third transverse bore to permit exhaust of the oversupply of fluid from the related pipe through said fluid conducting means and said third transverse bore.

11. In an automatic lathe having a drive motor and movable members; the combination as in claim 10, further comprising switch means associated with each of said compensating pistons, switch actuating means for each switch means extending into the bore receiving the related compensating piston and operated by the latter in response to a predetermined excessive pressure in the related pipe, an energizing circuit for operating said motor, signal means for each compensating piston, and an electrical control circuit connecting said switch means, signal means and energizing circuit so that, in response to the actuation of any one of said switch means, the operation of said motor is halted and the related signal means is operated to indicate the cause of the halt of operation of the motor.

References Cited in the file of this patent

UNITED STATES PATENTS

| | | | |
|---|---|---|---|
| 375,674 | Greene | Dec. 27, | 1887 |
| 919,465 | Richards | Apr. 27, | 1909 |
| 1,894,055 | Perkins | Jan. 10, | 1933 |
| 2,239,348 | Wirtanen et al. | Apr. 22, | 1941 |
| 2,383,180 | Ellinwood | Aug. 21, | 1945 |
| 2,426,695 | Kremiller | Sept. 2, | 1947 |
| 2,584,659 | Audemar et al. | Feb. 5, | 1952 |
| 2,623,358 | Greer | Dec. 30, | 1952 |
| 2,623,384 | Pigott | Dec. 30, | 1952 |
| 2,753,688 | Bunch | July 10, | 1956 |

FOREIGN PATENTS

| | | | |
|---|---|---|---|
| 1,081,189 | France | June 9, | 1954 |